(12) United States Patent
Yoon

(10) Patent No.: US 12,147,494 B2
(45) Date of Patent: Nov. 19, 2024

(54) METHOD OF USER ADAPTIVE RECOMMENDATION OF CONTACT LENSES AND APPARATUS OF PERFORMING THE METHOD

(71) Applicant: VP SOFT Co., Ltd., Daejeon (KR)

(72) Inventor: Kyung Tae Yoon, Gyeonggi-do (KR)

(73) Assignee: VP SOFT Co., Ltd., Daejeon (KR)

( * ) Notice: Subject to any disclaimer, the term of this patent is extended or adjusted under 35 U.S.C. 154(b) by 352 days.

(21) Appl. No.: 17/597,547

(22) PCT Filed: Aug. 17, 2021

(86) PCT No.: PCT/KR2021/010852
§ 371 (c)(1),
(2) Date: Jan. 11, 2022

(87) PCT Pub. No.: WO2022/203132
PCT Pub. Date: Sep. 29, 2022

(65) Prior Publication Data
US 2023/0139998 A1    May 4, 2023

(30) Foreign Application Priority Data
Mar. 23, 2021   (KR) .................. 10-2021-0037390

(51) Int. Cl.
G06V 20/20       (2022.01)
G06F 18/21       (2023.01)
G06T 19/00       (2011.01)

(52) U.S. Cl.
CPC ............ *G06F 18/21* (2023.01); *G06T 19/003* (2013.01)

(58) Field of Classification Search
CPC ..... G06F 18/21; G06T 19/003; G06V 10/762; G06V 20/20; G06V 40/193; G06V 40/19; G06Q 30/06
See application file for complete search history.

(56) References Cited

U.S. PATENT DOCUMENTS

| 6,095,650 A | 8/2000 | Gao et al. | |
| 6,746,120 B2 * | 6/2004 | Broderick | G02C 7/046 351/159.69 |
| 6,761,451 B2 * | 7/2004 | Pinciaro | G02C 7/046 351/159.28 |

(Continued)

FOREIGN PATENT DOCUMENTS

| JP | 2015090555 A | 5/2015 |
| KR | 20130103153 A | 9/2013 |
| KR | 20200114531 A | 10/2020 |

OTHER PUBLICATIONS

Japanese Office Action from Application No. 2022-500779 dated Jun. 20, 2023.

*Primary Examiner* — Aaron W Carter
(74) *Attorney, Agent, or Firm* — Park, Kim & Suh, LLC

(57) ABSTRACT

A method for user adaptive recommendation of contact lenses and apparatus for performing the method. The method of user adaptive recommendation of contact lenses may include imaging, by an apparatus for recommending contact lenses, a user image, receiving, by the apparatus for recommending contact lenses, information on a contact lens selected by a user, and generating, by the apparatus for recommending contact lenses, a virtual image based on the user image and the selected contact lens.

4 Claims, 6 Drawing Sheets

(56) References Cited

U.S. PATENT DOCUMENTS

| | | | | |
|---|---|---|---|---|
| 7,083,278 | B2* | 8/2006 | Broderick | G06Q 30/0601 |
| | | | | 351/159.66 |
| 7,364,293 | B2* | 4/2008 | Broderick | G06Q 30/0601 |
| | | | | 351/159.74 |
| 2003/0007123 | A1* | 1/2003 | Broderick | G02C 13/003 |
| | | | | 351/159.74 |
| 2004/0176977 | A1* | 9/2004 | Broderick | G02C 7/046 |
| | | | | 705/26.1 |
| 2006/0215110 | A1* | 9/2006 | Broderick | G02C 13/003 |
| | | | | 351/159.75 |
| 2008/0235047 | A1* | 9/2008 | Broderick | G02C 7/046 |
| | | | | 705/1.1 |
| 2017/0337740 | A1* | 11/2017 | Kim | G02C 7/04 |
| 2023/0101248 | A1* | 3/2023 | Yoon | C08K 5/09 |
| | | | | 523/106 |
| 2023/0139998 | A1* | 5/2023 | Yoon | G06F 18/21 |
| | | | | 382/100 |

* cited by examiner

METHOD OF USER ADAPTIVE RECOMMENDATION OF CONTACT LENSES AND APPARATUS OF PERFORMING THE METHOD

CROSS-REFERENCE TO RELATED APPLICATION

This application is a U.S. National Phase Application of International Application Number PCT/KR2021/010852, filed Aug. 17, 2021, which claims priority to and the benefit of Korean Patent Application No. 10-2021-0037390, filed on Mar. 23, 2021, the disclosure of which is incorporated herein by reference in its entirety.

BACKGROUND

1. Field of the Invention

The present invention relates to a method of user adaptive recommendation of contact lenses and an apparatus for performing the method. More specifically, the present invention relates to a method of user adaptive recommendation of contact lenses and an apparatus for performing the method capable of providing a virtual image to a user wearing contact lenses to recommend the contact lenses suitable for the user.

2. Discussion of Related Art

As an age group wearing contact lenses is lowered and interest in beauty increases, the demand for the contact lenses is increasing worldwide. Contact lenses are optical medical devices for vision correction and cosmetic purposes and are largely classified into soft contact lenses and hard contact lenses. However, the most widely used contact lenses in the world today are soft contact lenses that have less foreign body feeling, provide a comfortable fit, and are relatively inexpensive. These soft contact lenses are largely classified into 2 types: 1) transparent clear contact lenses and 2) colored contact lenses with various colors and iris pattern designs (hereinafter referred to as "graphics" or "graphic information") added to the transparent clear lenses.

An interesting point is that the market for the colored contact lenses has grown rapidly over the past ten years, mainly in the Asian market. These colored contact lenses have become a beauty/fashion item beyond simple vision correction. Therefore, the market for these colored contact lenses is showing rapid growth for a wide range of age groups, from the existing age groups of 20s to 30s to age groups of 10s to over 40s. Above all, more than 90% of Korean contact lenses manufacturers mainly produce colored contact lenses and are contributing to overseas export. The demand for the colored contact lenses is steadily increasing in all of Southeast Asia such as Korea, Japan, China, Thailand, Vietnam, the Middle East and Arab countries, and Central and South America. Above all, the market demand for the colored contact lenses made in Korea is continuously increasing due to the influence of the Korean Wave.

Unlike other general fashion items such as eyeglass frames and sunglasses that may be directly worn before purchase, due to the nature of the medical devices, which are worn in direct contact with eyeballs, which places importance on safety, the medical devices cannot be worn in advance prior to purchase. Therefore, these medical devices are purchased after simply checking their exterior designs and colors and being indirectly checked through photos, posters, catalogs, and the like in which other models wear the contact lenses. In this way, it is actually difficult to find colored contact lenses that best match your preferred eyeball color and style until you purchase the colored contact lenses in advance and then directly wear the colored contact lenses. Therefore, there is a need for research on technology to help a user to purchase lenses by providing a user image when wearing colored contact lenses selected by the user through the current augmented reality technology and virtual reality technology.

As the related art, an augmented reality technology such as Korean application number 10-2019-0105006 exists.

SUMMARY OF THE INVENTION

An object of the present invention is to solve all of the above problems.

In addition, an object of the present invention is to provide a virtual image when a user wears contact lenses selected by the user.

In addition, an object of the present invention is to recommend contact lenses having better visual effects when a user wears the contact lenses by providing a virtual image when wearing the contact lenses in real time based on user eye information and contact lens graphic information.

A representative configuration of the present invention for achieving the above object is as follows.

According to an embodiment of the present invention, a method of user adaptive recommendation of contact lenses may include imaging, by an apparatus for recommending contact lenses, a user image, receiving, by the apparatus for recommending contact lenses, information on a contact lens selected by a user, and generating, by the apparatus for recommending contact lenses, a virtual image based on the user image and the selected contact lens.

The user image may include a first imaged image and a second imaged image, the first imaged image may be an image of a user's face, the second imaged image may be an image of a user's eye, the user image may include user eye information, and the user eye information may include pupil information and iris information.

The virtual image may include a virtual eye image, and the virtual eye image may be generated based on the user eye information and contact lens graphic information.

According to another embodiment of the present invention, an apparatus for user adaptive recommendation of contact lenses may include a communication unit configured to communicate with a user device, and a processor configured to be operatively connected to the communication unit, in which the processor may be implemented to capture a user image, receive information on a contact lens selected by a user, and generate a virtual image based on the user image and the selected contact lens.

The user image may include a first imaged image and a second imaged image, the first imaged image may be an image of a user's face, the second imaged image may be an image of a user's eye, the user image may include user eye information, and the user eye information may include pupil information and iris information.

The virtual image may include a virtual eye image, and the virtual eye image may be generated based on the user eye information and contact lens graphic information.

DETAILED DESCRIPTION OF EXEMPLARY EMBODIMENTS

Figure 1:
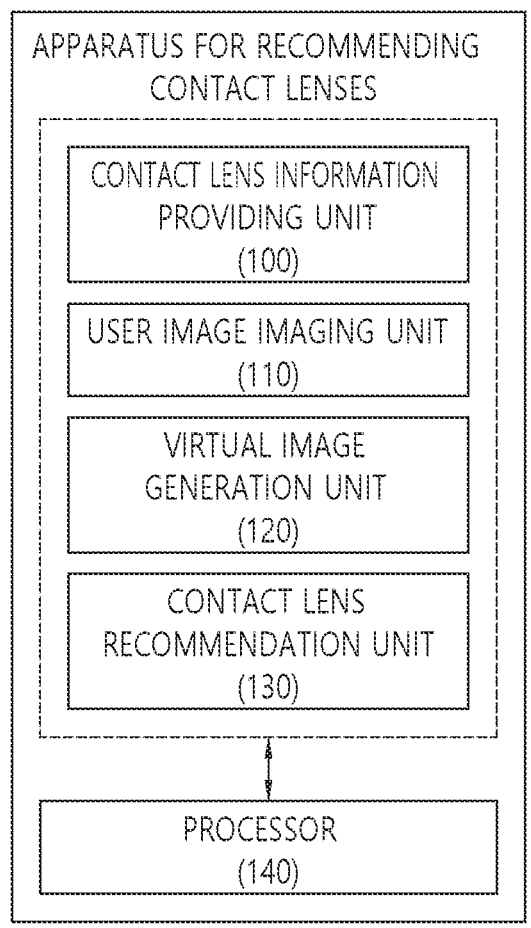
FIG. 1 is a conceptual diagram illustrating an apparatus for recommending contact lenses according to an embodiment of the present invention.

The detailed description of the present invention set forth below refers to the accompanying drawings, which show by way of illustration specific embodiments in which the invention may be practiced. These embodiments will be described in detail for those skilled in the art in order to practice the present invention. It should be appreciated that various exemplary embodiments of the present invention are different from each other but do not have to be exclusive. For example, specific shapes, structures, and characteristics described in the present specification may be changed from one embodiment to another embodiment and implemented without departing from the spirit and the scope of the present invention. In addition, it should be understood that a position or an arrangement of individual components in each disclosed embodiment may be changed without departing from the spirit and the scope of the present invention. Accordingly, the detailed description set forth below is not to be taken in a limiting sense, and the scope of the present invention should be taken as encompassing the scope of the claims and all equivalents thereto. In the drawings, like reference numerals refer to the same or similar elements throughout the various aspects.

Hereinafter, various preferred embodiments of the present invention will be described in detail with reference to the accompanying drawings so that those skilled in the art to which the present invention pertains may easily practice the present invention.

FIG. 1 is a conceptual diagram illustrating an apparatus for recommending contact lenses according to an embodiment of the present invention.

FIG. 1 illustrates an apparatus for recommending contact lenses for helping a user to select the contact lenses by virtually providing an image of the user wearing the contact lenses.

Referring to FIG. 1, the apparatus for recommending contact lenses may include a contact lens information providing unit 100, a user image imaging unit 110, a virtual image generation unit 120, a contact lens recommendation unit 130, and a processor 140.

The contact lens information providing unit 100 may be implemented to provide contact lens information. The contact lens information may include contact lens function information, contact lens color information, contact lens pattern information, and the like.

The contact lens function information may include information on a contact lens base curve, a contact lens diameter, a contact lens vision prescription, contact lens astigmatism intensity, and a contact lens astigmatism angle.

The contact lens color information may include information on colors of the contact lenses. The colored contact lenses have colors, and the contact lens color information may include information on colors of the colored contact lenses.

The contact lens pattern information may include information on patterns of contact lenses.

The contact lens color and the contact lens pattern may be a single color or a single pattern, but a plurality of colors and a plurality of patterns may be variously combined on one contact lens.

The combination of contact lens color and contact lens pattern may be expressed in terms of a contact lens graphic. The information on the combination of contact lens color and contact lens pattern may be expressed in terms of contact lens graphic information.

One contact lens may include at least one contact lens graphic. For example, one contact lens may include a first contact lens graphic, a second contact lens graphic, and a third contact lens graphic.

Each contact lens graphic has an "o" shape with respect to a center of the contact lens, and the first contact lens graphic, the second contact lens graphic, and the third contact lens graphic are positioned toward the outside with respect to the center of the contact lens, and a diameter of the "o" shape may increase toward the first contact lens graphic, the second contact lens graphic, and the third contact lens graphic.

The user image imaging unit 110 may be implemented to image a user image. In the present invention, since a virtual image of a user's face when the contact lenses selected by a user are worn is provided, it is necessary to obtain the user's face image by the user image imaging unit 110. In addition, since the user image imaging unit 110 needs to provide an image after a user wears contact lenses, more specific imaging of a user's eye may be required. To this end, additional imaging of the user's eye may be performed.

The virtual image generation unit 120 may be implemented to provide an image when the contact lenses selected by the user are worn. The virtual image generation unit 120 may generate a virtual image by combining the user image captured by the user image imaging unit 110 and the contact lens image selected by the user.

The contact lens recommendation unit 130 may be implemented to recommend contact lenses suitable for the user based on the user image.

The processor 140 may be implemented to control operations of the contact lens information providing unit 100, the user image imaging unit 110, the virtual image generation unit 120, and the contact lens recommendation unit 130.

Figure 2:
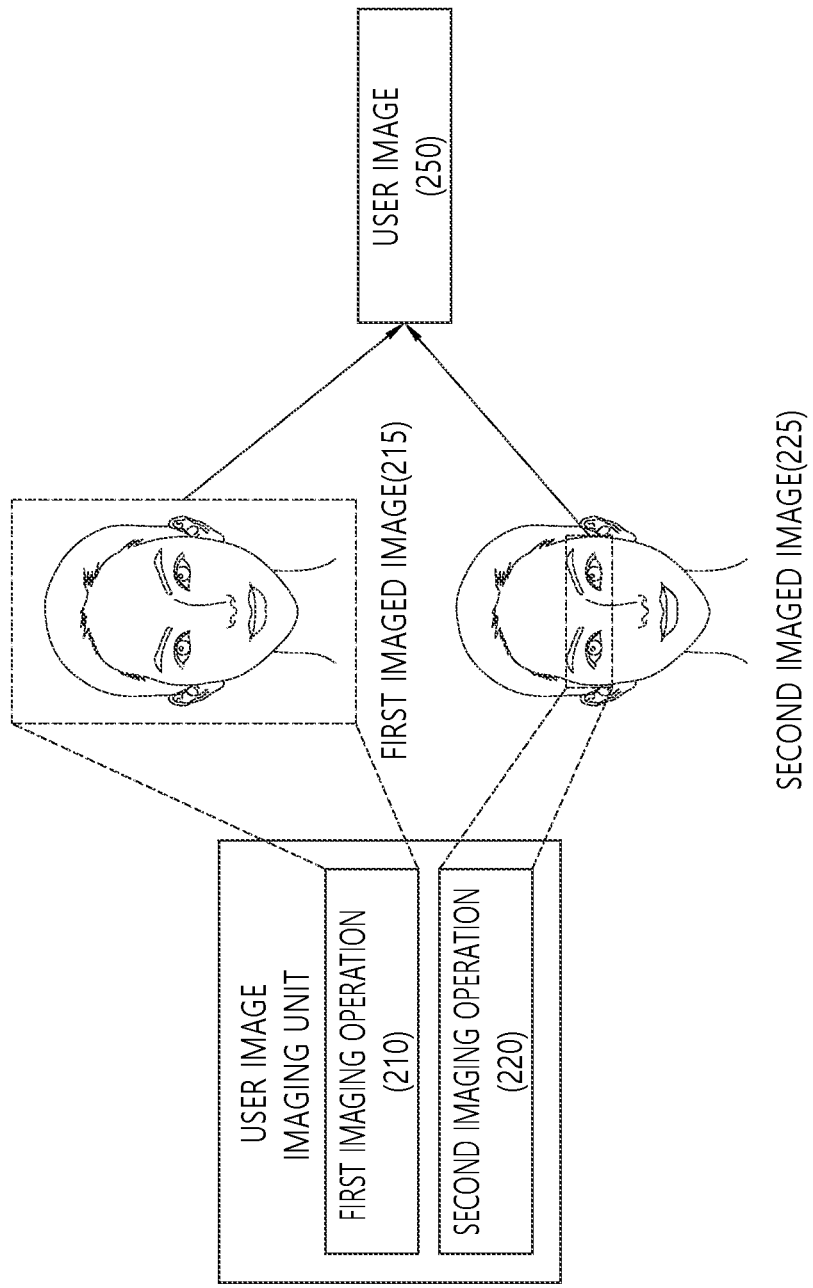
FIG. 2 is a conceptual diagram illustrating an imaging method of a user image imaging unit according to an embodiment of the present invention.

FIG. 2 is a conceptual diagram illustrating an imaging method of a user image imaging unit according to an embodiment of the present invention.

FIG. 2 illustrates a user image imaging method of a user image imaging unit.

Referring to FIG. 2, the user image imaging unit may perform a first imaging operation 210 and a second imaging operation 220.

The first imaging operation 210 may be an operation of imaging a user's face, and the second imaging operation 220 may be an operation of imaging a user's eye.

The first imaging operation 210 and the second imaging operation 220 may be sequentially performed or may be performed simultaneously.

A specific filming angle may be requested from a user for the first imaging operation 210. A specific face angle for most effectively generating a virtual image of a user is requested, and imaging according to the requested face angle may be performed. The first imaging operation 210 may not be one shot, but may be multiple shots at various angles.

The second imaging operation 220 may be filming of a user's eye. The second imaging operation 220 may be performed through object recognition of the user's eye. Recognition of the user's eye may be performed through various existing object recognition technologies. The second imaging operation 220 may request, to a user, to approach so as to image a user's eye and may perform filming of the user's eye after the approach to the user.

A user image 250 may be generated by combining the first imaged image 215 that is a result of the first imaging operation 210 and the second imaged image 225 that is a result of the second imaging operation 220. The user image information may separately include user eye information for generating an imaging result of contact lenses. The user eye information may include information on a substructure of a user's eye that constitutes a user's eye such as pupil size information, pupil information, and iris information and may have an affect on wearing contact lenses.

Figure 3:
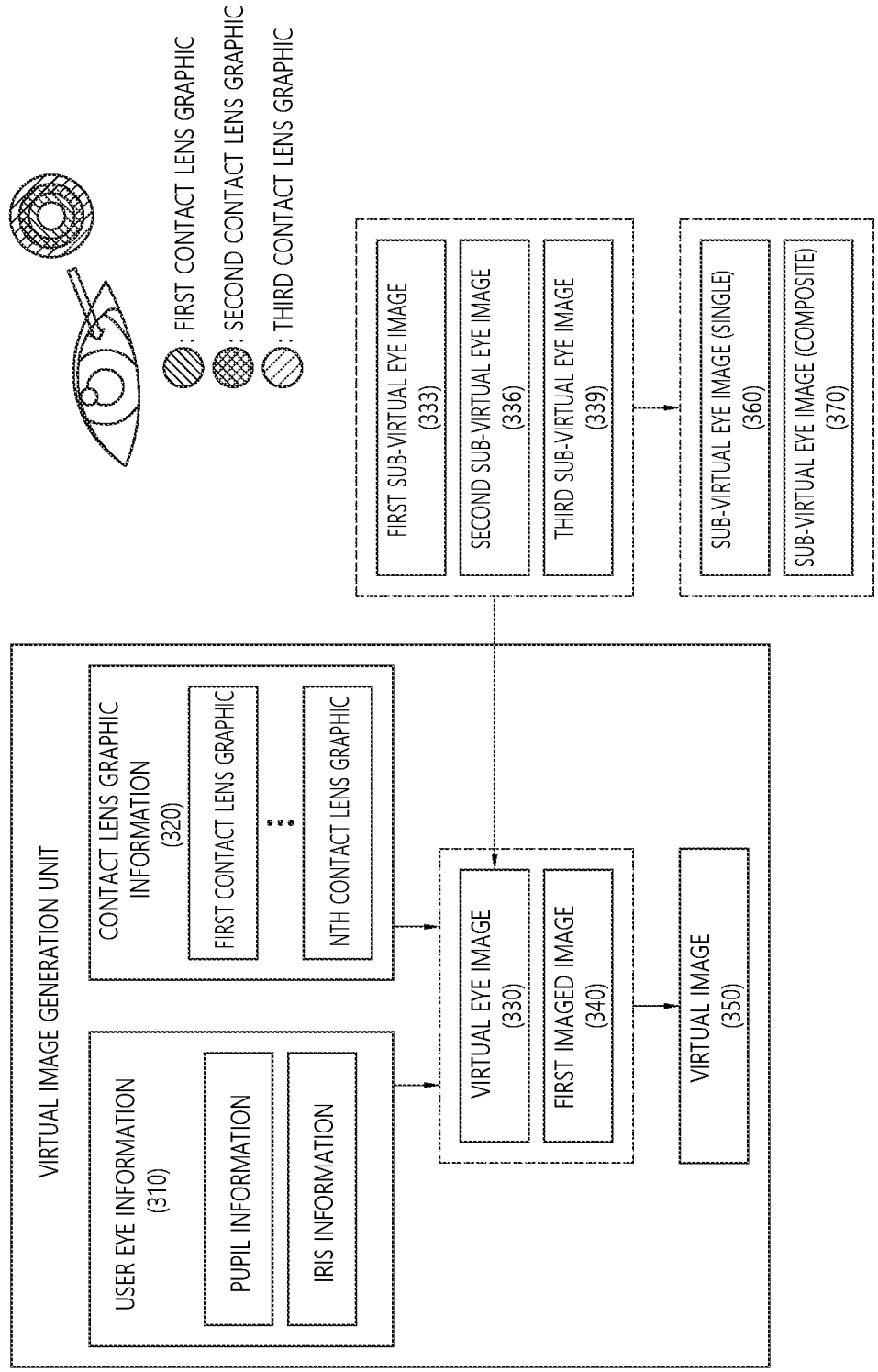
FIG. 3 is a conceptual diagram illustrating a virtual image generation operation of a virtual image generation unit according to an embodiment of the present invention.

FIG. 3 is a conceptual diagram illustrating a virtual image generation operation of a virtual image generation unit according to an embodiment of the present invention.

FIG. 3 illustrates an operation of a virtual image generation unit for generating a virtual image based on user image information and contact lens information that is selected by a user.

Referring to FIG. 3, a virtual image 350 may be generated based on user eye information 310 of a user and contact lens graphic information 320 of a contact lens.

Specifically, a virtual eye image 330 is generated based on the user eye information 310 and the contact lens graphic information 320 of the contact lenses, and a virtual image 350 may be generated of the contact lenses being worn by combining the virtual eye image 330 and the first imaged image 340.

As described above, the user eye information 310 may include pupil information and iris information. Each of the pupil information and the iris information may include information on the color and shape of the pupil and the iris, respectively. In addition, the contact lens graphic information 320 may include information on the color, shape, and diameter of each of at least one contact lens graphics included in the contact lenses.

The center of the pupil may be determined to generate the virtual eye image 330. The center of the pupil may be obtained to determine the position of the contact lens graphic on the pupil. A pupil region, an iris region, and an iris outer region are divided based on the center of the pupil, and the position of the contact lens graphic may be determined.

At least one contact lens graphic may be positioned only in each of the iris region and the iris outer region or may be simultaneously positioned on the iris region and the iris outer region. That is, the position of at least one contact lens graphic may vary according to the characteristics of the user's eye.

In the case of user 1, the first contact lens graphic may be positioned in the iris region, the second contact lens graphic may be positioned in the iris region, and the third contact lens graphic may be positioned simultaneously in the iris region and the iris outer region. In the case of user 2, the first contact lens graphic may be positioned in the iris region, the second contact lens graphic may be positioned in the iris region and the iris outer region, and the third contact lens graphic may be positioned in the iris outer region.

After the position of the contact lens graphic is determined on the iris region and the iris outer region, the virtual eye image 330 may be generated based on the user eye information 310 and the contact lens graphic information 320.

The virtual eye image 330 may be a combination of a plurality of sub-virtual eye images, and the plurality of sub-virtual eye images 333, 336, and 339 may be generated for each of the pupil region, the iris region, or the iris outer region.

The sub-virtual eye image for the pupil region may be a first sub-virtual eye image 333, the sub-virtual eye image for the iris region may be a second sub-virtual eye image 336, and the sub-virtual eye image for the iris outer region may be a third sub-virtual eye image 339.

The sub-virtual eye image may be divided into a sub-virtual eye image (composite) 370 in which a plurality of contact lens graphics are positioned and a sub-virtual eye image (single) 360 in which only one contact lens graphic is positioned.

The sub-virtual eye image (single) 360 may be generated by combining the user eye information and the contact lens graphic information corresponding to the region without separate division within the region.

The sub-virtual eye image (composite) 370 may be generated by dividing the contact lens graphic region and combining the user eye information and the contact lens graphic information corresponding to the region. For example, the second contact lens graphic and the third contact lens graphic may be positioned on the iris outer region, and the sub-virtual eye image (composite) 370 may be generated by dividing the region where the second contact lens graphic is positioned and the region where the third contact lens graphic is positioned.

More specifically, the sub-virtual eye image may be determined based on the color and shape of the iris and the shape and color when the color and shape corresponding to the contact lens graphic are combined.

A plurality of sub-virtual eye images may be combined to generate a virtual eye image, and the virtual eye image may be combined with the first imaged image to generate a virtual image of contact lenses being worn.

Figure 4:
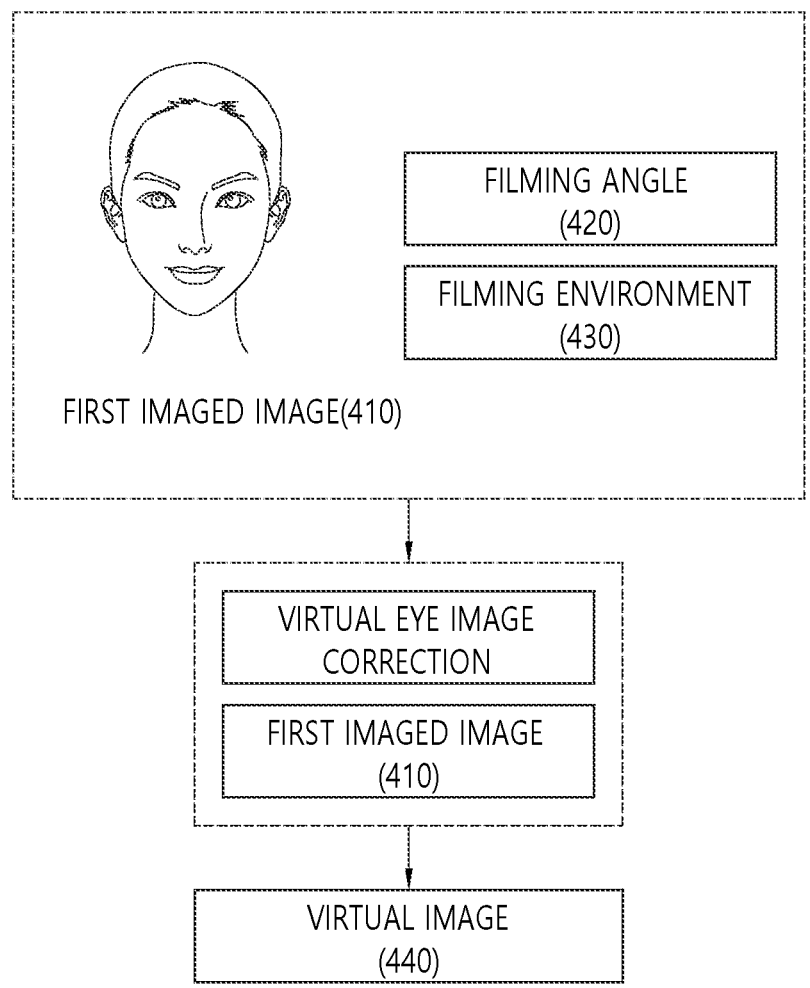
FIG. 4 is a conceptual diagram illustrating a method of generating a user image according to an embodiment of the present invention.

FIG. 4 is a conceptual diagram illustrating a method of generating a user image according to an embodiment of the present invention.

FIG. 4 illustrates a method of generating a virtual image when contact lenses are worn by combining a virtual eye image and a first imaged image.

Referring to FIG. 4, the virtual eye image may be partially corrected and combined with a first imaged image 410.

The first imaged image 410 has different characteristics depending on a user's filming angle and the environment (light amount, etc.) at the time of filming, and a distorted eye image may be provided on the virtual image when virtual eye images are combined without considering such characteristics during the imaging.

Accordingly, in order to remove distortion in the image, the virtual eye image may be corrected in consideration of the first imaged image information.

First, the correction may be performed on the virtual eye image at a specific filming angle in consideration of the filming angle 420.

The virtual eye image may be generated as a three-dimensional (3D) model, and the virtual eye image may be corrected in consideration of the user's filming angle based on the 3D model.

Next, the correction may be performed on the virtual eye image at a specific filming angle in consideration of the filming environment 430. For example, the virtual eye image may be corrected in consideration of the amount of light in a specific filming environment.

Through this correction, the virtual eye image may be more naturally combined with the first imaged image 410 to generate the virtual image 440.

According to an embodiment of the present invention, only the virtual eye image may be separately 3D modeled without being combined with the first imaged image 410, and provided on a platform. The user may acquire only the information on the virtual eye image while rotating at various angles.

Figure 5:
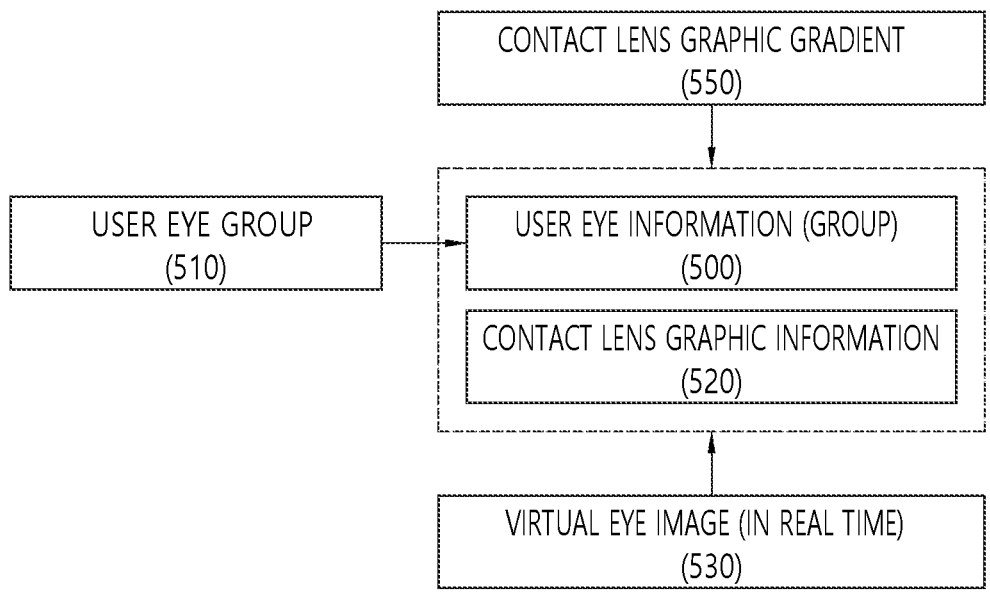
FIG. 5 is a conceptual diagram illustrating a virtual image real-time processing technology according to an embodiment of the present invention.

FIG. 5 is a conceptual diagram illustrating a virtual image real-time processing technology according to an embodiment of the present invention.

FIG. 5 illustrates a method of providing a virtual image in real time.

Referring to FIG. 5, in order to provide the virtual image in real time, the virtual eye image generated based on the user eye information and the contact lens graphic information needs to be provided quickly. The apparatus for recommending contact lenses may provide the virtual eye image, which best matches the user eye information among virtual eye images generated in advance, in real time.

The virtual eye image generated in advance by grouping a plurality of pieces of user eye information may be expressed in terms of a virtual eye image (in real time) 530. A user eye group 510 may be generated by being grouped according to the pupil information and the iris information, which are the user eye information, and user eye information (group) 500 may be the pupil information and the iris information corresponding to the user eye group 510.

Specifically, the virtual eye image (in real time) 530 may be generated based on the user eye information (group) 500 and contact lens graphic information 520.

The user eye information (group) 500 is determined based on the user eye information, and a virtual eye image (in real time) 530 corresponding to contact lens graphic information of a contact lens selected by the user may be provided in real time.

The user eye group 510 and the user eye information (group) 500 may be determined differently according to the contact lens graphic information 520.

For example, according to the color and shape of the contact lens graphic among the contact lens graphic information 520, contact lens graphic gradients 550 for specific pupil information and specific iris information may be different from each other. The contact lens graphic gradient 550 may be information on a size of a change of the contact lens graphic seen from the outside when the contact lenses are worn according to the user eye information. The contact lens graphic gradient 550 may be determined in consideration of each of a plurality of contact lens graphics corresponding to the contact lenses and may be determined by setting the highest weight to the contact lens graphic located at the outside.

The contact lens graphic gradient 550 may be determined in consideration of a contact lens color, a contact lens pattern, a contact lens graphic diameter, and/or a weight of the contact lens graphic.

As the contact lens color becomes relatively less similar to an iris color, the graphic gradient 550 may be set to be relatively large.

As the contact lens pattern, the graphic gradient 550 may be set to be relatively large as the number of patterns compared to an area of the contact lens graphic becomes relatively larger.

As the diameter of the contact lens graphic becomes relatively larger, the contact lens graphic gradient 550 is set to be relatively larger, and when a plurality of contact lens graphics are included, the more the contact lens graphic is located toward the outside, the higher the weight for the color is set, so the graphic gradient 550 may be set to be relatively large.

For example, in the case of a first color and a first shape of the contact lens graphic, the contact lens graphic gradient 550 may be relatively large according to the color change of the user's iris, and in the case of the second color and the second shape of the contact lens graphic, the contact lens graphic gradient 550 may be relatively small according to the color change of the user's iris.

Therefore, considering the color and shape of the contact lens graphic, a relatively large number of user eye groups may be set for the contact lens graphic with a relatively high contact lens graphic gradient 550, and conversely, a relatively small number of user eye groups 510 may be set for the contact lens graphic with a relatively low contact lens graphic gradient 550 The user eye image may be directly provided to the user in real time through the setting of the user eye group 510.

According to an embodiment of the present invention, in order to quickly provide a virtual image to a user, a virtual image (in real time) may be primarily provided using a virtual eye image (in real time), and at the same time, through the process of generating a virtual image described above, real user eye information may be acquired, and an individually generated virtual eye image may be provided based on the user eye information.

A user may first receive a virtual image (in real time) generated based on the user eye information (group) 500 through the user device and then receive the virtual image based on the actual user eye information. That is, when a user stays for less than a page threshold time on the page, the user may receive the virtual image (in real time), and when the user stays for more than the threshold time, the user may receive the virtual image based on the user eye information.

Alternatively, according to an embodiment of the present invention, when the user eye group 510 is generated, a user eye group (iris) based only on information on the iris and a user eye group (iris and pupil) based on information on the iris and pupil may be separately generated to generate the virtual eye image (in real time) (iris) and the virtual eye image (in real time) (iris and pupil). A method of generating a user eye group (iris) and a user eye group (iris and pupil) will be described below.

A virtual eye image (in real-time) (iris) generated based only on the iris that may have the most characteristics in the user's eye and cause changes when the contact lenses are worn may be primarily provided, and then a virtual eye image (in real time) (iris and pupil) may be secondarily provided, and finally, a virtual image based on user eye information of a real user may be provided.

In addition to this, in the present invention, a determination on a user access area (country) may be additionally performed for faster determination on the user eye group (iris). The user eye group (iris) and the user eye group (iris and pupil) may be determined more quickly in consideration of characteristics of user eye information of users residing in the access area (country).

Figure 6:
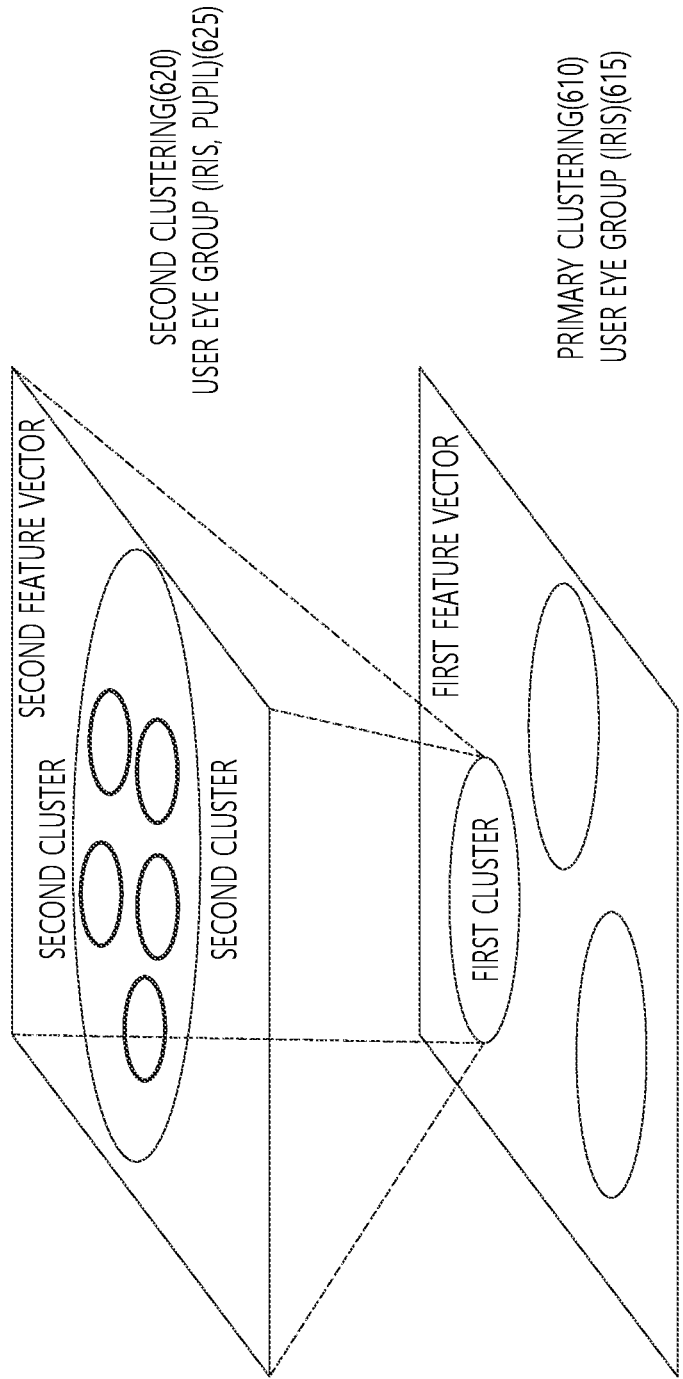
FIG. 6 is a conceptual diagram illustrating a virtual image real-time processing technology according to an embodiment of the present invention.

FIG. 6 is a conceptual diagram illustrating a virtual image real-time processing technology according to an embodiment of the present invention.

FIG. 6 illustrates a method of determining a user eye group and user eye information (group) for providing a virtual image in real time.

Referring to FIG. 6, grouping may be performed based on the pupil information and the iris information included in the user eye information to determine the user eye group.

The iris information is generated as a first feature vector, and the first feature vector may be (iris color feature, iris shape feature, and iris size feature).

The iris information is generated as a second feature vector, and the second feature vector may be pupil color feature and pupil size feature.

A user eye group may be formed through clustering based on the first feature vector and the second feature vector.

In the present invention, a user eye group (iris) 615 may be generated through primary clustering 610 based on only a first feature vector. For clustering based on the first feature vector, a center of the cluster may be determined in consideration of previously acquired user eye data.

According to an embodiment of the present invention, when the clustering is performed for faster clustering, the number of clusters and an initial center point of the cluster may be performed in consideration of an iris color of default user eye data.

A default iris color may be determined according to race and skin color, and the default iris color may be set as an initial center point of an initial cluster. The number and types of these default iris colors may be determined differently depending on the color diversity of the color contact lenses. For example, as the types of color contact lenses become more diverse, the default iris color may be set to be a relatively large number, and the number of initial center points may be set to be relatively large.

In addition, the number of clusters may be adjusted for more accurate clustering results, and the number of clusters may be adjusted according to the color diversity of color contact lenses to be determined.

Next, a user eye group (iris and pupil) 625 may be generated by adding the second feature vector through the second clustering 620 based on the first feature vector and the second feature vector. The user eye group (iris and pupil) 625 may be generated within the first cluster through second clustering 620, and a second cluster is generated within the first cluster based on additional classification in consideration of pupil characteristics. That is, a cluster of a smaller unit in which the pupil information is additionally considered is generated within the iris of the same similar range by additionally considering the cluster within the cluster, so the user eye group (iris and pupil) 625 may be determined.

Hereinafter, embodiments according to embodiments of the present invention may be implemented in a form of program commands that may be executed through various computer components and may be recorded on a computer-readable recording medium. The computer-readable recording medium may include a program command, a data file, a data structure, or the like, alone or as a combination thereof. The program commands recorded in the computer-readable recording medium may be especially designed and constituted for the present invention or may be known to those skilled in a field of computer software. Examples of the computer-readable recording medium may include a magnetic medium such as a hard disk, a floppy disk, or magnetic tape, an optical recording medium such as a compact disk read only memory (CD-ROM) or a digital versatile disk (DVD), a magneto-optical medium such as a floptical disk, and a hardware device specially configured to store and execute program commands, such as a read only memory (ROM), a random access memory (RAM), a flash memory, or the like. Examples of the program commands include a high-level language code executable by a computer using an interpreter, or the like, as well as a machine language code made by a compiler. A hardware device may be changed into one or more software modules to perform processing according to the present invention, and vice versa.

In the above, the present invention has been described with reference to specific matters such as specific components and limited embodiments and drawings, but these are only provided to help a more general understanding of the present invention, and the present invention is not limited to the above embodiments, and those of ordinary skill in the art to which the invention pertains can make various modifications and changes from these descriptions.

According to the present invention, it is possible to provide a virtual image when a user wears a contact lens selected by the user.

In addition, according to the present invention, it is possible to provide a virtual image to a user in real time when the user wears contact lenses based on user eye information and contact lens graphic information, and recommend the contact lenses having better visual effects when the user wears the contact lenses.

Therefore, the spirit of the present invention should not be limited to these exemplary embodiments, but the claims and all modifications equal or equivalent to the claims are intended to fall within the scope and spirit of the present invention.

What is claimed is:

1. A method of user adaptive recommendation of contact lenses, comprising:
generating a user image by combining an image of a user's face and an image of a user's eye;
receiving contact lens graphic information from a user, the contact lens graphic information identifying a first contact lens graphic selected by the user for a pupil region of the user's eye, a second contact lens graphic selected by the user for an iris region of the user's eye, and a third contact lens graphic selected by the user for an iris outer region of the user's eye;
generating a first sub-virtual eye image in which the first contact lens graphic is positioned in the pupil region;
generating a second sub-virtual eye image in which the second contact lens graphic is positioned in the iris region;
generating a third sub-virtual eye image in which the third contact lens graphic is positioned in the iris outer region;
generating a virtual eye image by combining the first, second, and third sub-virtual eye images; and
generating a virtual image by combining the virtual eye image and the image of the user's face.

2. An apparatus for user adaptive recommendation of contact lenses, comprising:
a processor configured to:
generate a user image by combining an image of a user's face and an image of a user's eye;
receive contact lens graphic information from a user, the contact lens graphic information identifying a first contact lens graphic selected by the user for a pupil region of the user's eye, a second contact lens graphic selected by the user for an iris region of the user's eye, and a third contact lens graphic selected by the user for an iris outer region of the user's eye;

generate a first sub-virtual eye image in which the first contact lens graphic is positioned in the iris region;

generate a second sub-virtual eye image in which the second contact lens graphic is positioned in the iris region;

generate a third sub-virtual eye image in which the second contact lens graphic is positioned in the iris outer region;

generate a virtual eye image by combining the first, second and third sub-virtual eye images; and generate a virtual image by combining the virtual eye image and the image of the user's face.

3. The method of claim 1, wherein each of the first, second, and third contact lens graphics is a combination of a contact lens color and a contact lens pattern.

4. The apparatus of claim 2, wherein each of the first, second, and third contact lens graphics is a combination of a contact lens color and a contact lens pattern.

\* \* \* \* \*